US012614684B2

(12) United States Patent
Suetterlin et al.

(10) Patent No.: US 12,614,684 B2
(45) Date of Patent: Apr. 28, 2026

(54) SWITCH SYSTEM

(71) Applicant: ABB Schweiz AG, Baden (CH)

(72) Inventors: Ralf-Patrick Suetterlin, Baden (CH); Pierre Corfdir, Wettingen (CH); Thierry Delachaux, Zürich (CH); Felix Theodor Erich Rager, Kleindöttingen (CH)

(73) Assignee: ABB Schweiz AG, Baden (CH)

(*) Notice: Subject to any disclaimer, the term of this patent is extended or adjusted under 35 U.S.C. 154(b) by 262 days.

(21) Appl. No.: 17/991,312

(22) Filed: Nov. 21, 2022

(65) Prior Publication Data

US 2023/0091491 A1 Mar. 23, 2023

Related U.S. Application Data

(63) Continuation of application No. PCT/EP2021/063520, filed on May 20, 2021.

(30) Foreign Application Priority Data

May 22, 2020 (EP) .................................... 20176059
Sep. 8, 2020 (EP) .................................... 20195134
(Continued)

(51) Int. Cl.
*H01H 33/28* (2006.01)
*H01H 3/22* (2006.01)

(52) U.S. Cl.
CPC .......... *H01H 33/285* (2013.01); *H01H 3/222* (2013.01)

(58) Field of Classification Search
CPC ...... H01H 33/285; H01H 3/222; H01H 9/542; H01H 1/20; H01H 33/40; H01H 71/12;
(Continued)

(56) References Cited

U.S. PATENT DOCUMENTS 2,897,408 A 7/1959 Kesselring et al.
2003/0179525 A1 9/2003 Baginski et al.
(Continued)

FOREIGN PATENT DOCUMENTS

CN 102568960 A 7/2012
CN 102751116 A 10/2012
(Continued)

OTHER PUBLICATIONS

Hátsági, "Electromagnetic modelling and testing of a Thomson coil based actuator," Master's Thesis, *KTH Royal Institute of Technology; School of Electrical Engineering*, 79 pp. (Jun. 2017).
(Continued)

*Primary Examiner* — Shawki S Ismail
*Assistant Examiner* — Lisa N Homza
(74) *Attorney, Agent, or Firm* — Fitch Even Tabin & Flannery LLP

(57) ABSTRACT

A switch system includes a mechanical switch for switching electrical currents, the mechanical switch operating in one of a closed state and an open state; the system further including an actuator configured to change the state of the mechanical switch, wherein the actuator comprises a Thomson-coil system including a Thomson coil, and wherein the mechanical switch and the Thomson coil are electrically connected in series.

12 Claims, 4 Drawing Sheets

(30) Foreign Application Priority Data

Dec. 15, 2020 (EP) .................................... 20214239
Dec. 15, 2020 (EP) .................................... 20214242

(58) Field of Classification Search
CPC ............... H01H 71/16; H01H 71/2454; H01H 2003/3089; H01H 2009/543; H01H 2009/54; H01H 3/30
USPC .......................................................... 335/147
See application file for complete search history.

(56) References Cited

U.S. PATENT DOCUMENTS

| | | | |
|---|---|---|---|
| 2012/0218676 | A1 | 8/2012 | Demetriades et al. |
| 2017/0154747 | A1 | 6/2017 | Bissal et al. |

FOREIGN PATENT DOCUMENTS

| | | | | | |
|---|---|---|---|---|---|
| CN | 105513844 | A | | 4/2016 | |
| CN | 106663554 | A | | 5/2017 | |
| CN | 106688070 | A | | 5/2017 | |
| DE | 3642136 | A1 | | 6/1988 | |
| DE | 102004056283 | A1 | | 6/2006 | |
| EP | 2871651 | A1 | | 5/2015 | |
| FR | 2733353 | A1 | | 10/1996 | |
| GB | 407853 | | | 3/1934 | |
| GB | 2022346 | A | | 12/1979 | |
| WO | WO 2014/048483 | A1 | | 4/2014 | |
| WO | WO-2015172824 | A1 | * | 11/2015 | H01H 3/28 |
| WO | WO-2019022659 | A1 | * | 1/2019 | H01H 3/60 |
| WO | WO 2020/055317 | A1 | | 3/2020 | |

OTHER PUBLICATIONS

Li et al., "Optimal Shape Design of a Thomson-Coil Actuator Utilizing Generalized Topology Optimization Based on Equivalent Circuit Method," *IEEE Transactions on Magnetics*, 47(5): 1246-1249 (May 2011).

Li et al., "Shape Optimization of a Thomson Coil Actuator for Fast Response Using Topology Modification," *J. of Electrical Engineering and Technology* (*JEET*), 7(1): 58-63 (2012).

Vilchis-Rodriguez et al., "Double-sided Thomson coil based actuator: finite element design and performance analysis," *8th IET International Conference on Power Electronics, Machines and Drives* (*PEMD 2016*), 6 pp. (Apr. 19-21, 2016).

European Patent Office, International Search Report in International Patent Application No. PCT/EP2021/063520, 4 pp. (Aug. 12, 2021).

European Patent Office, Written Opinion in International Patent Application No. PCT/EP2021/063520, 6 pp. (Aug. 12, 2021).

European Patent Office, International Search Report in International Patent Application No. PCT/EP2021/063516, 6 pp. (Jul. 26, 2021).

European Patent Office, Written Opinion in International Patent Application No. PCT/EP2021/063516, 7 pp. (Jul. 26, 2021).

European Patent Office, Extended European Search Report in European Patent Application No. 20214242.8, 6 pp. (Jun. 18, 2021).

European Patent Office, Extended European Search Report in European Patent Application No. 20214239.4, 9 pp. (Jun. 14, 2021).

English Translation of Office Action mailed Oct. 10, 2025 in Chinese Application No. 202180008602.X, 11 pages.

Building Electrician (《建筑电工》), Construction Industry Safety Association of Guangdong Province, Huazhong University of Science and Technology Press, Aug. 2017, p. 161.

* cited by examiner

SWITCH SYSTEM

CROSS-REFERENCE TO RELATED APPLICATIONS

This patent application claims priority to International Patent Application No. PCT/EP2021/063520, filed on May 20, 2021, which claims priority to European Patent Application No. 20176059.2, filed on May 22, 2020, European Patent Application No. 20195134.0, filed on Sep. 8, 2020, European Patent Application No. 20214242.8, filed on Dec. 15, 2020, and to European Patent Application No. 20214239.4, filed on Sep. 15, 2020, each of which is incorporated herein in its entirety by reference.

FIELD OF THE DISCLOSURE

The present disclosure relates to a switch system comprising an actuator based on a Thomson coil system.

BACKGROUND OF THE INVENTION

Thomson coil systems represent a class of fast actuators that have been developed for switching operations. Thomson coil systems typically comprise a flat coil with a conductive plate parallel to the flat coil. A current flowing through the coil creates a magnetic field that induces eddy currents into the plate, leading to large repulsive electromagnetic forces that can be used for actuation. In particular, in switching applications, these forces are used to promptly separate contacts of the mechanical switch. State-of-the-art Thomson coil systems are based on the principle that a current passing the coil of the Thomson coil system may be driven by an external electronic circuitry, by detecting a fault current using the external electronic circuitry and triggering a release of a stored electrical energy to pass the Thomson coil.

BRIEF SUMMARY OF THE INVENTION

The overall activation speed of the described Thomson coil system which is driven by an external electronic circuitry is limited by the system detecting the fault current and the electronic circuitry used for triggering the stored electrical energy.

The idea of a passive Thomson coil based actuator is to be triggered by using the energy of the fault current itself, i.e. by directly using the current change rate dI/dt of the fault current to generate the motion of the conductive plate. This method is thus instrumental in reducing the delay between the fault initiation and the contact separation of the mechanical switch using the Thomson coil system as actuator. The repulsive electromagnetic forces used for actuation and, therefore, the acceleration of the conductive plate are a function of the change rate of the current dI/dt.

Accordingly, a switch system is needed that changes very fast from a conductive to a nonconductive state for high current change rates dI/dt of a fault current.

Aspects of the present disclosure are related to a switch system and a use of the switch system with subject matter as described in the independent claims.

Advantageous modifications of the embodiments described herein are stated in the dependent claims. All combinations of at least two of the features disclosed in the description, the claims, and the figures fall within the scope of the invention. In order to avoid repetition, features disclosed in accordance with the method shall also apply and be claimable in accordance with mentioned systems.

To achieve these and other advantages, as embodied and broadly described herein, there is provided a switch system, comprising a mechanical switch for switching electrical currents, comprising a closed state and an open state. The switch system further comprises an actuator, configured to change the state of the mechanical switch, wherein the actuator comprises a Thomson-coil system including a Thomson coil, wherein the mechanical switch and the Thomson coil are electrically connected in series.

BRIEF DESCRIPTION OF THE SEVERAL VIEWS OF THE DRAWING(S)

DETAILED DESCRIPTION OF THE INVENTION

Figure 1:
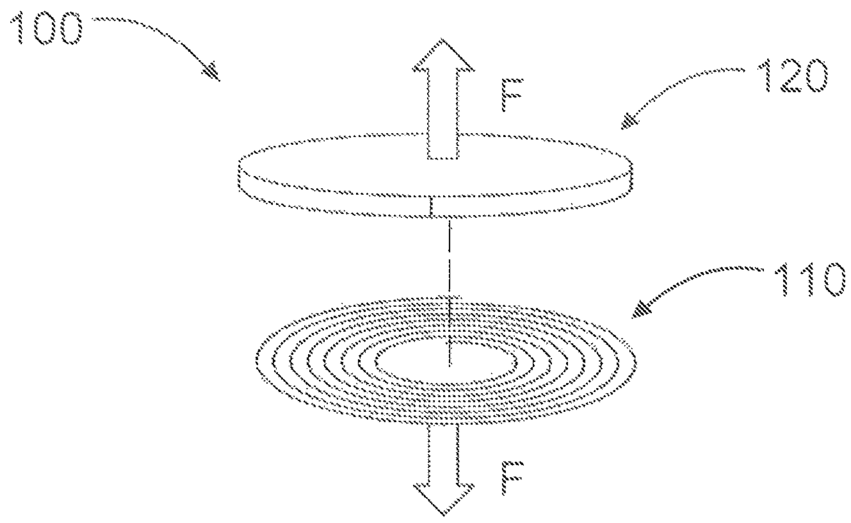
FIG. 1 is a schematic representation of a Thomson coil in accordance with the disclosure.

FIG. 1 sketches schematically a representation of a Thomson coil system 100, which can be used for an actuator actuating a mechanical switch 210. The magnetic field created by a current flowing through the flat coil 110 of the Thomson coil system 100 induces eddy currents inside of the conductive plate 120. The resulting repulsive electromagnetic forces F lead to the motion of the plate away from the coil, which can be used for actuating the mechanical switch 210.

Figure 2:
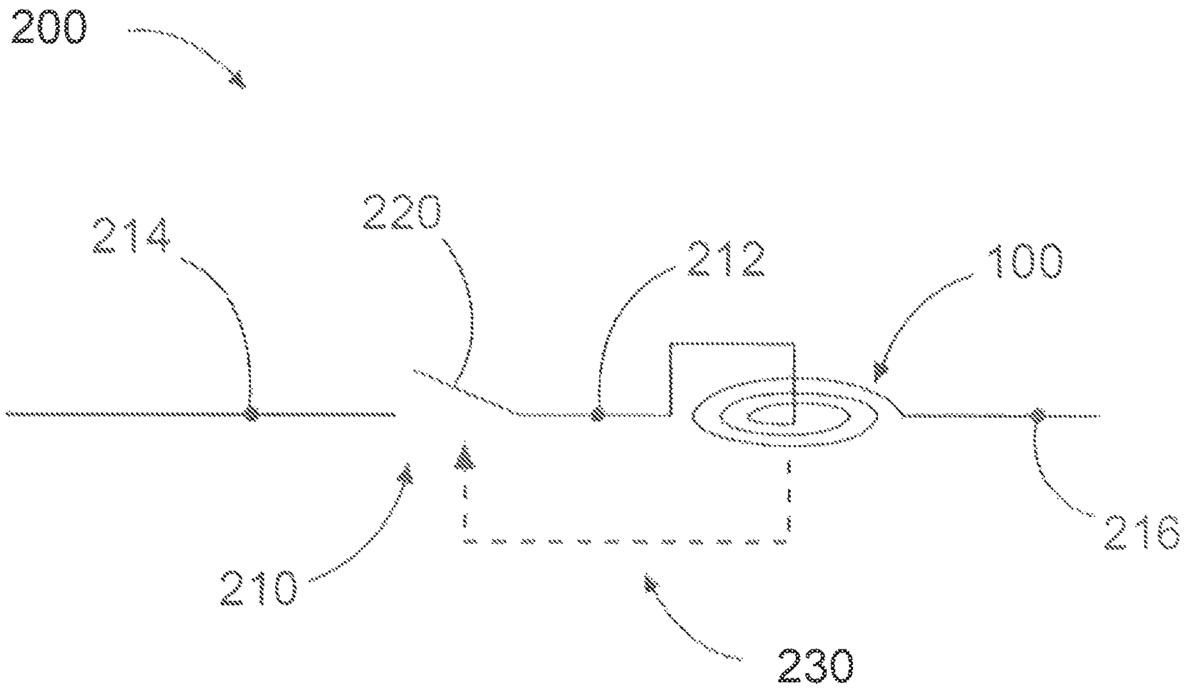
FIG. 2 is a schematic of a switch-system in accordance with the disclosure.

FIG. 2 sketches schematics of a switch system 200, comprising a mechanical switch 210 for switching electrical currents, comprising a closed state and an open state. The switch system 200 further comprises an actuator 100, configured, using a mechanical coupling 230, with the mechanical switch 210 to change the state of the mechanical switch 210, wherein the actuator 100 comprises a Thomson-coil system including a Thomson coil 110, wherein the mechanical switch 210 and the Thomson coil 110 are electrically connected by a contact point 212 in series.

Figure 5:
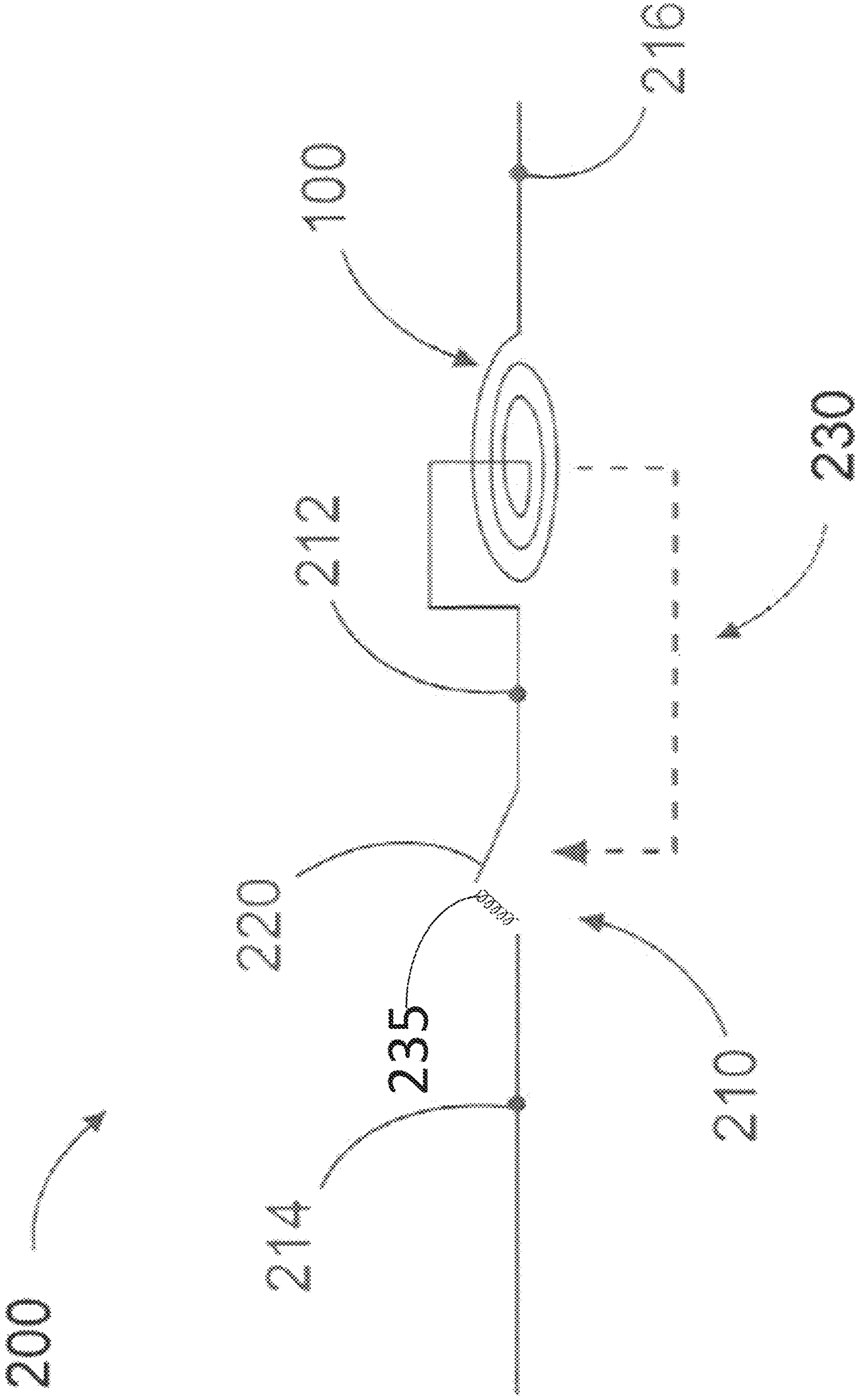
FIG. 5 is the schematic of FIG. 2 with the contact spring.

The mechanical switch 210 comprises a first conductor 212 and a second conductor 214 and a conductive bridge 220 which is coupled via the coupling 230 with the Thomson coil system including a Thomson coil 100. According to an aspect, the conductive bridge 220 of the mechanical switch 210 is retained in the conductive state by a contact spring (see FIG. 5 and contact spring 235).

Figure 3:
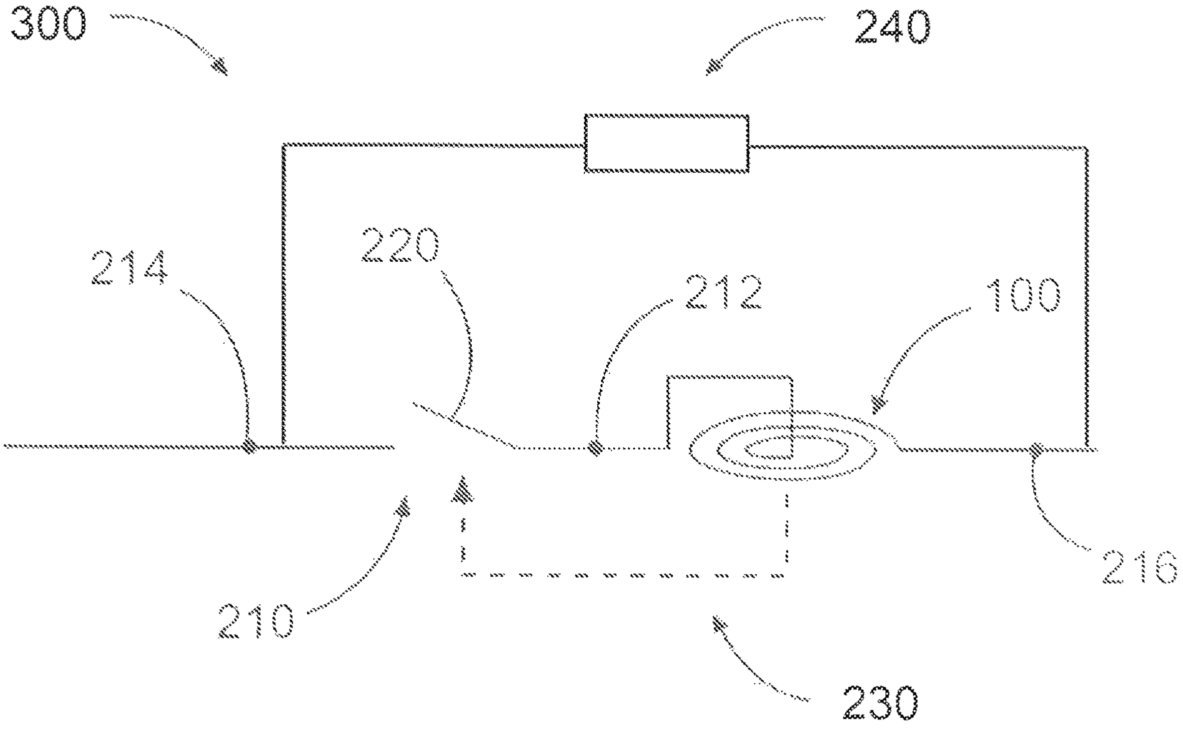
FIG. 3 is a schematic of an alternative embodiment for a switch system in accordance with the disclosure.

FIG. 3 sketches schematics of a switch system 300, comprising a mechanical switch 210 for switching electrical currents, comprising a closed state and an open state. The switch system 300 further comprises an actuator 100, configured, using a mechanical coupling 230, with the mechanical switch 210 to change the state of the mechanical switch 210, wherein the actuator 100 comprises a Thomson-coil system including a Thomson coil 110, wherein the mechanical switch 210 and the Thomson coil 110 are electrically connected by a contact point 212 in series. The switch system 300 further comprises an electronic circuitry 240, electrically coupled within the switch system 300 in parallel to the electrical connection of the mechanical switch 210 in series with the Thomson coil 110 of a Thomson coil system, at contact points 214 and 216 respectively, and arranged to interrupt and dissipate a commuted current caused by opening the mechanical switch 210. The mechanical switch 210 comprises a first conductor 212 and a second conductor 214 and a conductive bridge 220 which is coupled via the coupling 230 with the Thomson coil system including a Thomson coil 110.

Figure 4:
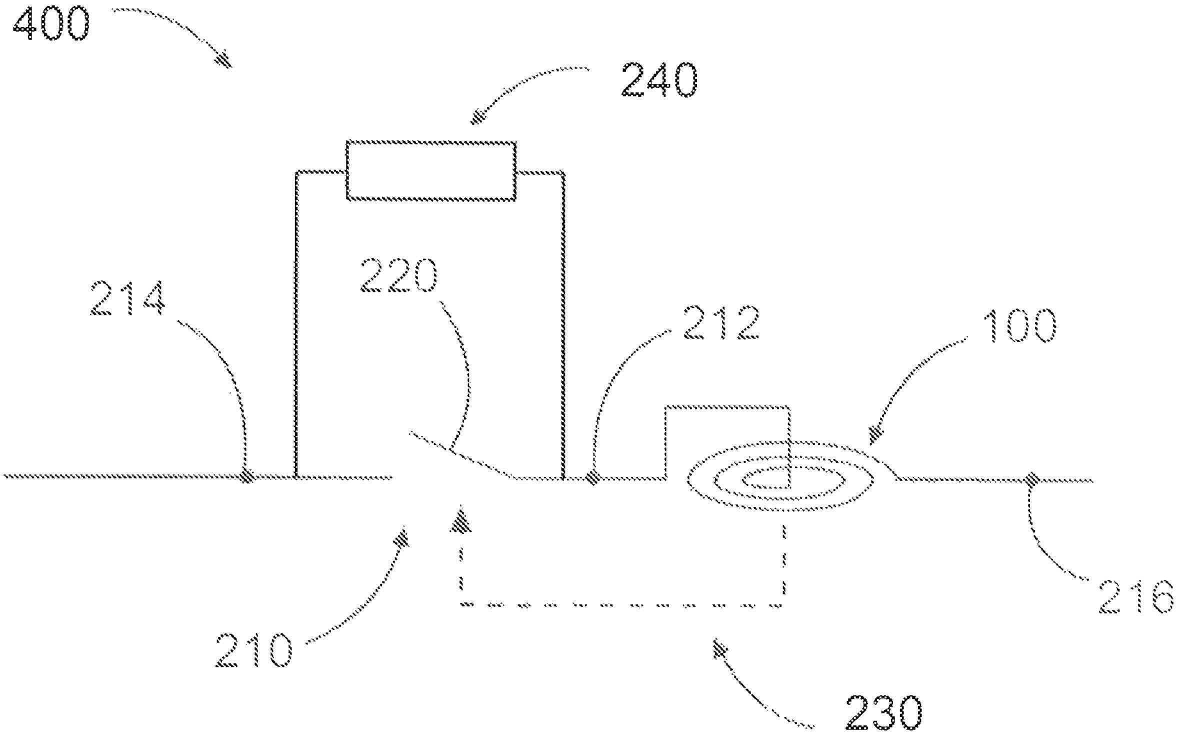
FIG. 4 is a schematic of yet another alternative embodiment for a switch system in accordance with the disclosure.

FIG. 4 sketches schematics of a switch-system 400, wherein the electrical coupling of the electronic circuitry 240 is the only difference to the former described switch-system 300 of FIG. 3. The electronic circuitry 240 of the switch-system 400 is directly electrically coupled in parallel to the mechanical switch 210 to interrupt and dissipate a commuted current caused by opening the mechanical switch 210.

In general, a Thomson coil system in accordance with the disclosure represents a class of fast actuators that have been developed for switching operations. As shown in FIG. 1 it includes a flat coil with a conductive plate parallel to the coil. If a current with a high current change rate is flowing through the Thomson coil, it creates a magnetic field that induces eddy currents into the plate, leading to large repulsive electromagnetic forces that can be used for actuation. In particular, in switching applications, these forces are used to promptly separate the contacts of a mechanical breaker. Thomson coil based actuators may present structures more complex than shown in the simple sketch of FIG. 1.

The switch system is arranged in such a way, that the electrical current passing through the mechanical switch passes through the Thomson coil that means that the Thomson coil is arranged in the main current path during normal operation of the switch system such that the electrical current passing through the mechanical switch passes through the Thomson coil of the Thomson coil system to drive the actuator changing the mechanical switch to change the state if the rate of change of the electrical current exceeds a limit value.

Such a switch system is a simple and fast reacting system for interrupting fault currents.

Advantageously, it can be shown by measurements, by using such a switch system that a current may be interrupted within 1.5 ms for a rate of change of the current (dI/dt) of 5 kA/ms at fault initiation, and faster for a larger rate of change of the current, because of the fast switching capability using a Thomson coil system as actuator in this electrical configuration.

According to an aspect the switch system is configured to change the state of the mechanical switch to the open state, if a rate of change of a current passing the Thomson coil and the mechanical switch exceeds a limit value.

The change of the state of the mechanical switch may be achieved by a configuration of the actuator, based on a Thomson coil system, changing the state of the mechanical switch depending on the current change rate (dI/dt). To pass the electrical current of the mechanical switch through the Thomson coil provides a simple system of actuation.

Stated differently, if the actuator is based on a passive Thomson coil system, the actuation of the actuator is depending on the change rate of the current dI/dt. The switch system provides an opening velocity of the contacts of the mechanical switch depending on a current change rate dI/dt for the high current change rates, due to the Thomson coil system.

The change of the conductive state of the mechanical switch may be a change from the conductive state to the nonconductive state. The change of the conductive state of the mechanical switch by the actuator may be provided by a mechanical coupling of the actuator with the mechanical switch. As an example the actuator may be mechanically coupled to a conductive plate of the mechanical switch to increase the distance between the conductive bridge and at least one conductor of the mechanical switch to toggle the mechanical switch from the conductive to the nonconductive state.

Because the actuator is based on a Thomson coil system it follows that the actuator provides a high sensitivity to the rate of change of the current.

Advantageously there is no sensor needed to provide this functionality of the actuator.

According to an aspect the switch system further comprises an electronic circuitry that is electrically coupled to the switch system and arranged to interrupt and dissipate a commuted current caused by an opening of the mechanical switch.

Advantageously the fast opening of the switch system on high change rate of current dI/dt using a Thomson coil system may interrupt the fault current of direct current (DC) systems quickly, and in addition may allow coordination with other protective devices such as fuses for instance. For instance if the change rate of the current exceeds a specific value the contacts of the mechanical switch are sufficiently separated after 500 us so that the current has commuted to and been interrupted by the electronic circuitry.

Opening the mechanical switch means the process that the state of the mechanical switch is changed from the closed state to the open state within a time interval. For this at least two contact pads of the mechanical switch, which are in mechanical and electrical contact in the closed state will be mechanically separated from each other. During that process there might be still electrical contact between the at least two contact pads because of arcing.

Under nominal operation, the electrical current flows through the mechanical switch and the Thomson coil only. When a fault with a high rate of change of current occurs, the electrical current is commuted to the electronic circuitry coupled to the switch system for current interruption and dissipation, wherein this commutation is initiated by the beginning of the opening of the mechanical switch.

Advantageously such a hybrid mechanical switch with an electronic circuitry combines the low on-state resistance of mechanical switch with the high speed current breaking capability of the electronic circuitry.

If, as a result of a fault current, the rate of change of the current exceeds a limit, the current flowing through the Thomson coil creates a magnetic field that induces eddy currents into the plate, leading to large and repulsive electromagnetic forces used for actuation of the mechanical switch into an open state. In particular, this force is used to promptly separate the contacts of the mechanical breaker by a mechanical coupling of the Thomson coil system with the mechanical switch, enabling a commutation of the current to the electronic circuitry for energy dissipation and current interruption as to prevent the mechanical switch from a dielectric breakdown between the contacts of the mechanical switch.

Experiments show that using such a switch system comprising an electronic circuitry directly electrically coupled in parallel to the mechanical switch further improves the switch system to interrupt a fault current within 0.5 ms for a rate of change of the current (dI/dt) of 5 kA/ms at fault initiation.

According to an aspect the electric circuitry comprises active electronic components.

The electronic circuitry may in addition comprise passive electronic components for current interruption and dissipation. Using for instance an insulated-gate bipolar transistor (IGBT) enables the switch system to interrupt the commutated current very fast, after a distance between the electrical contacts of the mechanical switch is large enough to not resulting in a dielectric breakdown during interruption of the commutated current.

According to an aspect the electronic circuitry consists of passive electronic components.

According to an aspect the electronic circuitry is directly electrically coupled in parallel to the mechanical switch.

If the electronic circuitry is directly electrically coupled parallel to the mechanical switch there is an improvement in the speed of the change of the state of the mechanical switch, that means the speed for opening the mechanical switch, because the inductivity of the Thomson coil cannot influence the speed of the current commutation, because the Thomson coil is not included in that part of the circuitry. In addition, because the Thomson coil is outside of the electric branch including the electronic circuitry there is still a current within the Thomson coil driving the commutation of the current to the electronic circuitry for current interruption and dissipation.

According to an aspect the electronic circuitry is electrically coupled in parallel to the electrical connection of the mechanical switch in series with the Thomson coil.

Connecting the electronic circuitry in parallel to the series connection of the Thomson coil and the mechanical switch, enables a commutation of the electrical current to the electronic circuitry after the mechanical switch starts to get into the open state.

According to an aspect the electronic circuitry comprises an insulated-gate bipolar transistor and a varistor, which are electrically connected in parallel.

Using an insulated-gate bipolar transistor (IGBT) for switching the commutated electrical current enables the switch system to interrupt the commutated electrical current very fast, because a conductive state of insulated-gate bipolar transistor can be interrupted very fast.

The electronic circuitry may comprise a varistor as a Voltage Dependent Resistor for current dissipation, and especially a metal oxide-varistor (MOV) to protect the insulated-gate bipolar transistor after interruption of the commutated current.

According to an aspect the electronic circuitry of the switch system may comprise two insulated-gate bipolar transistors, which are electrically antiparallel coupled with each other. With the help of the additional insulated-gate bipolar transistor electrically coupled antiparallel to the other insulated-gate bipolar transistor the switch system is enabled to operate in DC systems in both electrical current directions to provide a bidirectional switching capability for electrical currents. For improving the switch system the electronic circuitry may comprise further insulated-gate bipolar transistors.

As an example, the electronic circuitry may comprise two insulated-gate bipolar transistors electrically coupled antiparallel and one varistor electrically coupled in parallel to the insulated-gate bipolar transistors.

According to an aspect a number of turns of an electrical conducting path of the Thomson coil is between 4 and 50 and/or an outer diameter of the Thomson coil is between 20 mm and 250 mm.

In one embodiment, the range for turns of an electrical conducting path of the Thomson coil comprises values between and including 4 and 50.

In addition or alternatively the diameter of the Thomson coil comprises values between and including 20 mm and 250 mm.

These values of the parameters of the Thomson coil result in a fast actuation of the Thomson coil system.

With the Thomson coil having a number of turns between and including 4 and 50, and/or a diameter between and including 20 mm and 250 mm, it is ensured that the repulsive electromagnetic forces created are large enough to change quickly the state of the mechanical switch from close to open, and interrupts fault currents for a wide range of DC and AC applications at low and medium voltages.

According to an aspect the mechanical switch comprises a first conductor, configured to be on a first electrical potential and a second conductor, configured to be on a second electrical potential and wherein the mechanical switch is configured to be in the closed state if the first conductor is in mechanical contact to the second conductor. The mechanical switch is further configured to be in the open state if the first conductor comprises a distance to the second conductor.

The actuator may be mechanically coupled to a conductive bridge to increase the distance between a conductive plate and the first and/or the second conductor if the actuator is triggered by the rate of change of the electrical current passing the mechanical switch and by this break a galvanic contact between the first and second conductor. Alternatively or in addition the actuator may be mechanically coupled to one of the conductors, wherein this mechanically coupled conductor is configured to be movable to change the distance between the two conductors to provide an open state and a closed state of the mechanical switch.

For instance, the mechanical switch may comprise a contact pair including the first conductor and the second conductor, wherein one of the conductors is a fixed conductive rod and the other conductor is arranged to be movable up and down to provide the electrical and mechanical contact depending on the distance of the two conductors. Alternative or in addition the two conductors may be arranged within a vacuum housing to provide a vacuum interrupter.

Advantageously the mechanical switch of the switch system may have a simple construction.

The conductive bridge may be separate from the first and second conductor and/or the conductive bridge may be part of one of the conductors. That means the conductive bridge may move on its own and/or the conductive bridge may be continuously electrically and mechanically connected to one of the contacts.

Using other words, the mechanical switch may, e.g., be a mechanical switch with one fix contact and one moving contact, but includes all other types of mechanical switches.

According to an aspect the conductive bridge of the mechanical switch is retained in the conductive state position by a contact spring.

Such a closing spring may provide the force for a solid electrical contact between the conductive bridge and the respective conductors of the mechanical switch. And the Thomson coil system is arranged to overcome a force of the contact spring if the rate of change of the current exceeds a limit value.

According to an aspect of the present disclosure. the actuator is configured to change the state of the mechanical switch, if a rate of change of the current passing the actuator is beyond a limit value of a change rate of the current.

The change of the state of the mechanical switch may be from the closed state to the open state.

According to an aspect the actuator is configured to change a distance between the first conductor and the second conductor of the mechanical switch.

Advantageously this gives a huge number of construction possibilities for the switch system. That means that the actuator may be configured to push or alternatively pull a contact and/or a contact bridge of the mechanical switch.

A use of a switch system according to one of switch systems as described above is provided to protect a battery energy storage system and/or electrical vehicles and/or electrical vehicle chargers or data-centers, preferably in case of fault currents and/or short-circuit currents and/or overload currents.

Respectively an application of the switch system as described may relate to low and medium voltage switching.

A use of a switch system according one of the switch systems as described above is provided to interrupt electrical circuits, which carry alternating currents, preferably in case of alternating fault currents and/or alternating short-circuit currents and/or alternating overload currents.

The following part of the specification describes a modified switch system as shown in FIGS. 2 and 3.

The modified switch system includes a mechanical switch for electrical currents, comprising a conductive state and a nonconductive state. The modified switch system further comprising a first actuator configured to change the state of the mechanical switch, wherein an actuation of the first actuator is based on a Thomson coil system. The modified switch system further comprises a second actuator configured to change the state of the mechanical switch comprises a loaded spring system locked by a latch system and wherein the first actuator and the second actuator each are configured to change the state of the mechanical switch depending on a property of an electrical current passing through the mechanical switch.

According to an aspect of the disclosure, the modified mechanical switch is mechanically coupled to the first actuator and/or the second actuator.

According to an aspect of the disclosure, the Thomson coil system is a passive Thomson coil system. That means that the Thomson coil system is based on a passive Thomson coil.

The dependency on a property of an electrical current for changing the state of the mechanical switch may be achieved by a configuration of the first actuator, based on a Thomson coil system, changing the mechanical switch state depending on the current change rate (dI/dt), and it may be a configuration of the second actuator changing the mechanical switch state depending on a threshold value of the electrical current passing through the mechanical switch.

In one embodiment, if the first actuator is based on a passive Thomson coil system, the actuation of the first actuator is depending on the current change rate dI/dt. If the dI/dt is too slow, then the Thomson coil system can hardly open the mechanical switch. Therefore, a loaded spring actuator is provided reacting slower than the first actuator, which is based on a passive Thomson coil system, for large current change rates dI/dt.

This modified switch system provides an opening velocity of the contacts depending on a current change rate dI/dt for the high current change rates, due to the first actuator, which is based on a Thomson coil system. Because of the second actuator based on a spring loaded system, where its actuation may depend on an amount of the electrical current, which is independent of the current change rate dI/dt, this modified switch system provides change of the state of the mechanical switch including slow current change rates dI/dt due to the use of a spring system. The opening velocity by the loaded spring system is a function of the spring stiffness, the spaces and tolerances between the various moving parts, as well as of the mass of the moving parts, which can be fast for a correctly designed system, resulting in an opening velocity of the spring system reaching an opening gap of the mechanical switch of 1 mm in a time range of about 2 ms.

Advantageously, the modified switch system as described is able to change to the nonconductive state in respect to a full spectrum of faulty currents, being extremely quick for the large current change rates dI/dt and able to toggle to the nonconductive state on over-currents as well, where some more time (some ms) is allowed for reaction.

Such a modified switch system combining two different actuators provides one system to handle faulty currents as well as smaller over-currents and the modified switch system as claimed includes the functionality to be operated manually, thereby avoiding an additional switch to save space and cost related to an additional switch for manual operation.

The latch system for locking the loaded spring system may be simply constructed using different possible unlock mechanisms and the modified switch system may be constructed to additionally lock in an open nonconductive end position.

If the spring system is designed to reach an open gap of 1 mm in about 2 ms, then it can be seen from FIG. 3 that for large dI/dt the Thomson plate will actuate first, as expected, and then the slower spring system will still act "fast" enough to hold respectively lock the contacts in the full open position.

Advantageously, the fast opening of the modified switch system on high change of current rates dI/dt may interrupt the fault current of direct current (DC) systems quickly based on the Thomson coil system, and in addition may allow coordination with other protective devices such as fuses. Whereas, slower change of current rates dI/dt, such as over currents, may be handled successfully by the loaded spring actuator.

According to an aspect of the disclosure, the mechanical switch comprises a first conductor, configured to be on a first electrical potential and a second conductor, configured to be on a second electrical potential and a conductive bridge, wherein the conductive bridge is configured to be in electrical contact with the first conductor and the second conductor for the conductive state, and without electrical contact with at least one of the conductors for the nonconductive state.

The conductive bridge may be separate from the first and second conductor and/or the conductive bridge may be part of one of the conductors. That means the conductive bridge may move on its own and/or the conductive bridge may be continuously be electrically and mechanically connected to one of the contacts.

Using other words, the mechanical switch may, e.g. be a mechanical switch with one fix contact and one moving contact parallel to each other, but includes all other types of mechanical switches.

For instance, the first actuator and the second actuator may be coupled to the conductive bridge to increase the distance between the conductive plate and the first and/or the second conductor if the actuator is triggered by the electrical current passing the mechanical switch and by this break a galvanic contact between the first and second conductor.

Advantageously, the mechanical switch of the modified switch system may have a simple construction.

According to an aspect of the disclosure, the conductive bridge is retained in the conductive state position by a closing spring.

Such a closing spring may provide the force for a solid electrical contact between the conductive bridge and the respective conductors of the mechanical switch.

According to an aspect of the disclosure, the first actuator is configured to change the conductive state of the mechanical switch, if a rate of change of the current passing the mechanical switch is beyond a current change limit.

The change of the conductive state of the mechanical switch may be a change from the conductive state to the nonconductive state. The change of the conductive state of the mechanical switch by the first actuator may be provided by a mechanical coupling of the first actuator with the mechanical switch. As an example the first actuator may be mechanically coupled to the conductive plate to increase the distance between the conductive bridge and at least one of the conductors to toggle the mechanical switch from the conductive to the nonconductive state.

Because the first actuator is based on a Thomson coil system it follows that the first actuator provides the sensitivity to the rate of change of the current.

Advantageously, there is no sensor needed to provide this functionality of the first actuator.

According to an aspect of the disclosure, the electrical current passing through the mechanical switch passes through a Thomson coil of the Thomson coil system to drive the first actuator changing the mechanical switch to change the state.

To pass the electrical current of the mechanical switch through the Thomson coil provides a simple system of actuation.

According to an aspect of the disclosure, the second actuator is configured to change the state of the mechanical switch if an amount of the electrical current passing through the mechanical switch exceeds a current value limit. That means if an electrical current passing through the mechanical switch exceeds a current threshold the second actuator will change the state of the mechanical switch because of its configuration.

In this way, the modified switch system can be adapted to faulty currents with a low current change rate but with an amount of the electrical current passing through the mechanical switch which exceeds a current value limit.

According to an aspect of the disclosure, the latch system of the second actuator is configured to unlock the loaded spring if the amount of the electrical current passing through the mechanical switch exceeds a current value limit.

By this, the second actuator may interact with the mechanical switch to change from a conductive state to a nonconductive state if the loaded spring is released by unlocking the latch depending on an amount of electrical current.

This provides the advantage that for toggling the state of the mechanical switch itself no electrical energy from the circuitry has to be provided.

According to an aspect of the disclosure, the latch system comprises a bimetallic strip, wherein the latch system is configured to at least partially pass the electrical current passing the mechanical switch through the bimetallic strip in order to unlock the loaded spring in case the current is beyond a current value limit.

A bimetallic strip is used to convert a temperature change into mechanical displacement. The strip consists of two strips of different metals which expand at different rates as they are heated, for instance steel and copper and/or steel and brass. The different expansions force the flat strip to bend one way if heated and in the opposite direction if cooled below its initial temperature. The metal with the higher coefficient of thermal expansion is on the outer side of the curve when the strip is heated and on the inner side when cooled. The current beyond a current value limit may increase the temperature of the bimetallic strip if passing the bimetallic strip.

Such a bimetallic strip provides a simple construction for the latch system to lock the loaded spring.

According to an aspect of the disclosure, the latch system comprises a magnetic shape memory alloy system and an electromagnetic coil, wherein the latch system is configured to at least partially pass the electrical current passing the mechanical switch through the electromagnetic coil changing the shape of the magnetic shape memory alloy system to unlock the loaded spring in case the current is beyond a current value limit.

Magnetic Shape Memory Alloys (MSM) change their shape under the influence of external magnetic fields and may comprise NiMnGa. In combination with an electromagnetic coil such a magnetic shape memory alloy system provides a simple and reliable latch system to keep the loaded spring in the lock position and release the spring if a magnetic field is provided to the magnetic shape memory alloy.

Alternatively, the electromagnetic coil of the latch system changing the shape of the memory alloy may be provided by electrical current, where the latch system is configured to provide an electrical current passing through the electromagnetic coil depending on a measurement result of a current measurement sensor measuring the electrical current passing the mechanical switch.

According to an aspect of the disclosure, the latch system is based on an electromechanical system.

Such an electromechanical system may for instance be an electrical relay. That means that the loaded spring of the second actuator may be locked by an electromechanical system, which is configured to release the loaded spring if at least partially the electrical current and/or a current which is proportional the current passing through the mechanical switch, passes through the electromechanical system to release the loaded spring if the current through the electromechanical system exceeds a specific limit.

According to an aspect of the disclosure, the latch system comprises a current measurement sensor measuring the electrical current passing the mechanical switch, wherein the latch system is configured to release the loaded spring in case the current passing through the mechanical switch is beyond a current value limit.

According to an aspect of the disclosure, the current measurement sensor comprises a shunt and/or a Rogowski coil and/or a Hall sensor.

The sensors provide a simple and reliable way to measure the electrical current.

According to an aspect of the disclosure, the first actuator and the second actuator are configured to each push or alternatively pull the contact bridge of the mechanical switch to change the state of the mechanical switch to the nonconductive state.

Advantageously, this gives a huge number of construction possibilities for the modified switch system.

That means that the first actuator as well as the second actuator may be configured to push or alternatively pull the contact bridge. That means that an actuator may push and the other actuator may pull the contact bridge or both may actuate the same way by pushing or pulling the contact bridge to change the state of the mechanical switch to the nonconductive state.

According to an aspect of the disclosure, the first and/or the second actuator of the modified switch system as described above is configured to change the state of the mechanical switch manually and/or remotely, based on a trigger signal, impacting the first actuator and/or the second actuator.

The triggering signal may be an electrical signal impacting the first and/or second actuator.

That means that, in addition to the release mechanisms described above, i.e., by a change of the current rate or a current above a certain current limit, the modified switch system may be configured to be opened or closed manually, e.g. by releasing the loaded spring manually to open the mechanical switch and/or by manual loading the spring to close the mechanical switch.

Additionally, or alternatively, the modified switch system may be configured to be opened remotely, based on a trigger signal, e.g. by releasing the loaded spring remotely, to open the mechanical switch, using the latch system, which may be configured to release the loaded spring based on the trigger signal.

Additionally, or alternatively, the modified switch system may be configured to be closed remotely, based on a trigger signal, e.g. by loading the spring of the second actuator remotely, to close the mechanical switch, using an electromechanical system, which may be configured to load the spring, based on the trigger signal.

The manual and/or remote control of the modified switch system allows to disconnect and/or connect the mechanical switch of the modified switch system as part of an electrical circuit as a contactor.

A use of the modified switch system according to one of modified switch systems as described above is provided to protect a battery energy storage system and/or electrical vehicles and/or electrical vehicle chargers or data-centers in case of fault currents and/or short-circuit currents and/or overload currents.

The modified switch system may be used for protection of a battery energy storage system, but also for instance for data centers and/or electrical vehicle charging systems. Respectively an application of the modified switch system as described may relate to low and medium voltage switching.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A switch system, comprising:

a mechanical switch for switching electrical currents, comprising a closed state and an open state; and an actuator configured to change the state of the mechanical switch, wherein the actuator comprises a Thomson-coil system including a Thomson coil, the Thomson coil comprising:

a flat coil with a conductive plate parallel to the flat coil;

wherein a number of turns of an electrical conductive path of the Thomson coil is between 4 and 50, and wherein an outer diameter of the Thomson coil is between 20 mm and 250 mm;

wherein the mechanical switch and the Thomson coil are electrically connected in series.

2. The switch system according to claim 1, wherein the switch system is configured to change a state of the mechanical switch to the open state in response to a rate of change of a current passing the Thomson coil and the mechanical switch exceeds a limit value.

3. The switch system according to claim 1, further comprising an electronic circuitry that is electrically coupled to the switch system and arranged to interrupt and dissipate a commuted current caused by an opening of the mechanical switch.

4. The switch system according to claim 1, wherein the electric circuitry comprises active electronic components.

5. The switch system according to claim 1, wherein the electronic circuitry consists of passive electronic components.

6. The switch system according to claim 1, wherein the electronic circuitry is directly electrically coupled in parallel to the mechanical switch.

7. The switch system according to claim 1, wherein the electronic circuitry is electrically coupled in parallel to the electrical connection of the mechanical switch in series with the Thomson coil.

8. The switch system according to claim 1, wherein the electronic circuitry comprises an insulated-gate bipolar transistor that is electrically connected in parallel with a varistor.

9. The switch system according to claim 1, wherein the mechanical switch comprises:

a first conductor configured to be disposed on a first electrical potential; and a second conductor configured to be on a second electrical potential;

wherein the mechanical switch is configured to be in the closed state when the first conductor is in mechanical contact with the second conductor, and wherein the mechanical switch is configured to be in the open state when the first conductor is in spaced apart relation with the second conductor.

10. The switch system according to claim 9, wherein a conductive bridge of the mechanical switch is retained in the closed state by a contact spring.

11. The switch system according to claim 1, wherein the actuator is configured to change a state of the mechanical switch when a rate of change of current passing through the actuator is beyond a limit value of a change rate of the current.

12. The switch system according to claim 1, wherein the actuator is configured to change a distance between the first conductor and the second conductor of the mechanical switch.

* * * * *